(12) United States Patent
Juul et al.

(10) Patent No.: US 9,113,644 B2
(45) Date of Patent: Aug. 25, 2015

(54) BLOOM RETARDING FAT

(75) Inventors: Bjarne Juul, Tranbjerg J (DK); Morten Daugaard Anderson, Aarhus C (DK)

(73) Assignee: AAK Denmark A/S, Aarhus C (DK)

( * ) Notice: Subject to any disclaimer, the term of this patent is extended or adjusted under 35 U.S.C. 154(b) by 0 days.

(21) Appl. No.: 14/111,322

(22) PCT Filed: Apr. 14, 2011

(86) PCT No.: PCT/DK2011/000027
§ 371 (c)(1),
(2), (4) Date: Dec. 23, 2013

(87) PCT Pub. No.: WO2012/139574
PCT Pub. Date: Oct. 18, 2012

(65) Prior Publication Data
US 2014/0120236 A1    May 1, 2014

(51) Int. Cl.
| | |
|---|---|
| A23G 1/36 | (2006.01) |
| A23D 9/00 | (2006.01) |
| A23D 9/02 | (2006.01) |
| C11B 7/00 | (2006.01) |
| C11C 3/10 | (2006.01) |
| A23G 1/56 | (2006.01) |

(52) U.S. Cl.
CPC .. *A23G 1/36* (2013.01); *A23D 9/00* (2013.01); *A23D 9/02* (2013.01); *A23G 1/56* (2013.01); *C11B 7/0075* (2013.01); *C11C 3/10* (2013.01)

(58) Field of Classification Search
None
See application file for complete search history.

(56) References Cited

U.S. PATENT DOCUMENTS

| | | | | |
|---|---|---|---|---|
| 4,276,322 | A * | 6/1981 | Padley et al. | 426/660 |
| 4,283,436 | A * | 8/1981 | Soeters et al. | 426/607 |
| 4,594,259 | A * | 6/1986 | Baker et al. | 426/613 |
| 4,910,037 | A * | 3/1990 | Sagi et al. | 426/601 |
| 5,241,091 | A * | 8/1993 | Yoshihara et al. | 554/13 |
| 5,342,644 | A * | 8/1994 | Cain et al. | 426/660 |
| 5,424,090 | A | 6/1995 | Okawauchi et al. | |
| 5,968,584 | A * | 10/1999 | Cain et al. | 426/607 |
| 6,103,292 | A * | 8/2000 | Del Vecchio | 426/601 |
| 7,611,744 | B2 | 11/2009 | Cain et al. | |
| 2007/0269468 | A1 | 11/2007 | Bach et al. | |
| 2009/0068318 | A1 * | 3/2009 | Cleenewerck et al. | 426/93 |
| 2009/0123633 | A1 * | 5/2009 | Cleenewerck et al. | 426/607 |
| 2010/0196544 | A1 * | 8/2010 | Cleenewerck | 426/74 |
| 2010/0215811 | A1 * | 8/2010 | Favre et al. | 426/94 |

FOREIGN PATENT DOCUMENTS

| | | |
|---|---|---|
| CN | 1085390 | 4/1994 |
| CN | 101035434 | 9/2007 |
| CN | 101511201 | 8/2009 |
| EP | 0 285 522 | 10/1988 |
| JP | 2009 284899 | 12/2009 |
| RU | RU 2 374 860 | 12/2009 |
| WO | WO 93/24017 | 12/1993 |
| WO | WO 2006/037341 | 4/2006 |
| WO | WO 2007/090477 A1 | 8/2007 |
| WO | WO 2007/144132 | 12/2007 |

OTHER PUBLICATIONS

Shahidi, F. editor. 2005. Bailey's Industrial Oil and Fat Products, 6th edition, vol. 2. Wiley Interscience, New Jersey. p. 677-682.*
Kevin W. Smith et al., "Effect of nut oil migration on polymorphic transformation in a model system," Food Chemistry, vol. 102 (2007). pp. 656-663.
PCT International Preliminary Report on Patentability issued by the European Patent Office for International Application No. PCT/DK2011/000027, dated Jul. 17, 2013.
IUPAC 2.150, "Solid content determination in fats by NMR (Low resolution nuclear magnetic resonance," pp. 59-70, cited at p. 10 of the application filed on Dec. 23, 2013.

* cited by examiner

*Primary Examiner* — Carolyn Paden
(74) *Attorney, Agent, or Firm* — Finnegan, Henderson, Farabow, Garrett & Dunner

(57) ABSTRACT

The invention relates to a bloom retarding fat composition comprising a component A and a component B. Component A is present in an amount of 40-95% (w/w) of said bloom retarding fat composition, and component B is present in an amount of 5-60% (w/w) of said bloom retarding fat composition. Component A comprises a fat composition having a content of SatOSat TAGs of 60% (w/w) or higher. Component B comprises a fat composition having a content of saturated fatty acids of 30% (w/w) or less. In component B the total content of Sat2U TAGs of 18% (w/w) or less, and a content Sat3 TAGs of 8% (w/w) or less. Further in component B the content of SatSatU TAGs in Sat2U of component B is 1% (w/w) or more. Also the molar ratio of SatSatU:SatUSat TAGs is 1 or higher in component B and wherein Sat is a C16-20 saturated fatty acid, and wherein O stands for oleic acids; U stands for unsaturated fatty acids, including oleic acid. The invention relates to various applications of such a bloom retarding fat composition.

27 Claims, No Drawings

BLOOM RETARDING FAT

This application is a national stage filing under 35 U.S.C. §371 of International Application No. PCT/DK2011/000027 filed on 14 Apr. 2011, the contents of which is incorporated herein by reference.

TECHNICAL FIELD

The present invention relates to the field of fat compositions for confectionary, especially fat compositions for chocolates. More specifically the present invention relates to a bloom retarding fat composition and uses thereof.

BACKGROUND OF THE INVENTION

Chocolate is throughout the world regarded as being one of the finest types of confectionary and various types and shapes of chocolate confectionary have been developed over the years. The innovation within the field of chocolate has been much focused on sensory aspects, such as taste, and mouth feel. However, also the visual appearance is an important aspect in the consumer's overall perception of the quality of a chocolate confectionary. Accordingly, the visual appearance of a chocolate confectionary plays a key role for the chocolate manufacturer because a less attractive appearance of the confectionary will easily be judged by the consumer to relate to a confectionary of inferior quality.

An important problem relating to the visual appearance of a chocolate confectionary is the bloom effect which might take place in the coating of the chocolate confectionary. Such bloom effect is easily recognisable on the surface of that coating because in case a blooming has occurred, the coating of the confectionary will have a rather dull appearance having less gloss and often having clearly visible bloom crystals on the surface. The appearance of bloom, if any, typically takes place after weeks or months of storage.

Chocolate generally comprises cocoa butter, cocoa solids and sugar. Milk fat and/or milk proteins, emulsifies and other ingredients may be present in chocolate composition as well.

In the manufacturing process of chocolate, the ingredients are mixed refined and conched to a mixture. The mixture is subjected to a tempering process in a tempering apparatus in which the chocolate is subjected to a carefully pre-programmed temperature profile. Subsequently, the chocolate is used for making the chocolate confectionary (e.g. as a coating, a filling, a layer in a chocolate bar etc.) and the resulting confectionary is cooled following a predetermined cooling program.

The tempering process serves the purpose of making a sufficient amount of a desired type of seed crystals of the solid fats present in the chocolate, which in turns is responsible for obtaining a rather stable chocolate product which is less prone to changes in the crystal composition of the solid fats. The desired seed crystals are of the crystal form Form V. It is believed that the bloom effect occurring in chocolate confectionary is occasioned by polymorph transformation of fat crystals present in the chocolate.

Of the ingredients used for making chocolate, cocoa butter is by far the most expensive. For this reason, chocolate manufacturers have developed less expensive cocoa butter equivalents (CBE for short) which are compatible with cocoa butter in all ratios.

The general perception is that, mixing cocoa butter and/or cocoa butter equivalents with soft oils like soy oil, rapeseed oil, sunflower oil etc in a relative high content, may result in decrease in shelf life. It should be noted though, that bloom may also occur in a chocolate product in case the chocolate composition has been poorly tempered.

The bloom in chocolate coatings is a well studied phenomenon and among chocolate manufactures it is agreed that the bloom effect is inter alia occasioned by solid fat crystals transforming from the Form V to the Form VI crystal phase. Such recrystallisation into Form VI crystals may then accordingly result in bloom on the surface of the chocolate confectionary.

In the prior art various ways of avoiding the bloom effect in chocolates have been suggested. Such suggestions for avoiding bloom formation relate inter alia to optimising tempering conditions, adding high-melting milk fat fractions or sorbitan tristearate to the chocolate.

However, also specifically altering the TAG composition of a chocolate may lead to reduced bloom.

U.S. Pat. No. 5,524,090 accordingly discloses an anti-bloom agent comprising not less than 40% by weight of triglycerides of the form SatSatU, wherein Sat is a saturated fatty acid and wherein U is an unsaturated fatty acid, and wherein not less than 75% of all the Sat fatty acids are selected from the group comprising stearic acid and palmitic acid. In another embodiment, the content of the SatSatU triglycerides in the anti-bloom agent is not less than 20% by weight. The anti-bloom agent disclosed in U.S. Pat. No. 5,524,090 is intended for being added to a hard butter or a hard butter product, such as raw fats and oils, e.g. a cocoa butter product, such as chocolate in an amount that increases the content of SatSatU triglycerides in that product by 2-25%.

Addition of the anti-bloom agent according to U.S. Pat. No. 5,524,090 results in delayed formation of Form VI-crystals. A raise in the SatSatU content of cocoa butter by adding an anti-bloom agent according to U.S. Pat. No. 5,524,090 in an amount increasing the SatSatU content by 16% thus resulted in an decrease to 1.06 in the ratio of the x ray powder diffraction intensity of Form VI/Form V after 7 months storage, compared to cocoa butter having no such anti-bloom agent added, in respect of which the corresponding ratio was 1.63.

In an article of K. V. Smith et al. in Food Chemistry 102 (2007) 656-663 an investigation of the effect of formation of Form VI crystals by adding hazel nut oil to cocoa butter was published. The investigation reveals that adding hazel nut oil to cocoa butter significantly increases the rate of formation of Form VI crystals, even if the hazel nut oil was added in only minute amounts. Hazel nut oil in amounts of 0, 1, 2, 5, 10, 20% respectively were mixed with cocoa butter at 60° C. Thereafter, the mixtures were tempered and stores at 15, 20 and 25° C. X-ray diffraction was used to determine the progression of Form VI crystal formation. The results in the Smith article shows that after five weeks at 25° C., cocoa butter without hazel nut oil showed 28.3% Form VI, whereas cocoa butter comprising 20% hazel nut oil exhibited almost full transformation from Form V to Form VI. Even addition of 5% hazel nut oil in cocoa butter was able to lead to almost full transformation into form Form VI after ten weeks storage at 25° C.

Accordingly, the Smith article shows that even very small amounts of hazel nut oil in cocoa butter leads to considerable increased transformation from crystal Form V to Form VI.

Accordingly, in the art of chocolate manufacture there still exists a need for a fat composition which in a chocolate composition will act bloom retarding on the one hand, and which on the other hand will allow for cost savings in respect of the TAGs to be used in the chocolate composition.

It is the object of the present invention to provide such a bloom retarding fat composition.

BRIEF DESCRIPTION OF THE INVENTION

In a first aspect the present invention relates to a bloom retarding fat composition. The bloom retarding fat composition according to the first aspect of the present invention comprises a component A and a component B;

said component A being present in an amount of 40-95% (w/w) of said bloom retarding fat composition, and said component B being present in an amount of 5-60% (w/w) of said bloom retarding fat composition; wherein said component A comprising a fat composition having a content of SatOSat TAGs of 60% (w/w) or higher; and wherein said component B comprising a fat composition having a content of saturated fatty acids of 30% (w/w) or less, and a total content of $Sat_2U$ TAGs of 18% (w/w) or less, and a content $Sat_3$ TAGs of 8% (w/w) or less with the proviso that if the content of SatSatU TAGs in component B is 1% (w/w) or more, then the molar ratio of SatSatU:SatUSat TAGs is 1 or higher; and wherein Sat is a C16-20 saturated fatty acid, and wherein O stands for oleic acids; U stands for unsaturated fatty acids, including oleic acid.

The bloom retarding fat composition according to the first aspect of the present invention has been found to suppress bloom formation when included in a chocolate composition. This bloom retarding effect is very surprising in view of the general knowledge in the art that adding a fat composition having a TAG composition resembling that of component B of the bloom retarding fat composition according to the first aspect of the present invention will have the opposite effect; viz. the effect of promoting bloom formation as evidenced by the article of K. V. Smith et al. in Food Chemistry 102 (2007) 656-663.

The article of K. V. Smith et al. in Food Chemistry 102 (2007) 656-663 accordingly suggests that adding hazel nut oil to cocoa butter indeed will enhance the bloom effect of that fat composition. Seeing that hazel nut oil has a fat composition comprising approximately 65% OOO, 18% $StO_2$ and less than 2% SatOSat TAGs, a skilled person within the art of chocolate manufacture would never had been prompted to come to the conclusion that adding a fat composition corresponding to component B of the first aspect of the present invention in combination with the component A of the first aspect of the present invention would have been able to suppress bloom formation in a chocolate composition.

Hence, the K. V. Smith et al. article teaches away from the idea that a fat composition having a content of a component defined as component B of the fat composition according to the first aspect of the present invention would have any bloom retarding effect.

U.S. Pat. No. 5,524,090 does not disclose an anti-bloom agent comprising a SatOSat composition in an amount of 40-95% (w/w) in combination with a fat composition in an amount of 5-60% (w/w) having a content of saturated fatty acids of 30% (w/w) or less, and a total content of $Sat_2U$ TAGs of 18% (w/w) or less, and a content $Sat_3$ TAGs of 8% (w/w) or less with the proviso that if the content of SatSatU TAGs in component B is 1 mol % or more, then the molar ratio of SatSatU:SatUSat TAGs is 1 or higher. In contrast, U.S. Pat. No. 5,524,090 discloses a fat composition having a not less than 20% (w/w) SatSatU.

Hence, neither U.S. Pat. No. 5,524,090 discloses or suggests that a fat composition according to the first aspect of the present invention would have a bloom retarding effect in a chocolate composition.

In a second aspect, the present invention relates to a method of manufacturing a fat composition according to the first aspect of the present invention, said method comprising the steps:
i) providing a desirable amount of component A;
ii) providing a desirable amount of component B;
iii) optionally providing a desirable amount of other components;
iv) mixing together the components provided in step i), ii) and iii).

In a third aspect, the present invention relates to a use of a fat composition according to the first aspect of the present invention for retarding bloom formation in a chocolate or a chocolate like product.

The present invention relates in a fourth aspect to a confectionary fat comprising a bloom retarding fat composition according to the first aspect of the present invention.

The present invention relates in a fifth aspect to a chocolate or chocolate like product comprising a bloom retarding fat composition according to the first aspect of the present invention; or comprising a confectionary fat according to the fourth aspect of the present invention.

The present invention relates in a sixth aspect to a filling for a chocolate or a chocolate like product comprising a bloom retarding fat composition according to the first aspect of the present invention; or comprising a confectionary fat according to the fourth aspect of the present invention.

In a seventh aspect the present invention relates to a method of manufacturing a chocolate or a chocolate like product according to the fifth aspect of the present invention, said method comprising the steps:
a) mixing a bloom retarding fat composition according to the first aspect of the present invention with other traditionally and/or conventionally chocolate ingredients in order to obtain a chocolate composition, or a chocolate like composition;
b) subjecting the composition obtained in step a) for a thermal tempering process;
c) cooling the composition obtained in step b).

Finally, in an eighth aspect, the present invention relates to a chocolate confectionary or a chocolate like confectionary comprising a chocolate or chocolate like product according to the fifth aspect of the present invention, or comprising a filler according to the sixth aspect of the present invention.

DETAILED DESCRIPTION OF THE INVENTION

As mentioned above, the present invention relates in a first aspect to a bloom retarding fat composition. The bloom retarding fat composition according to the first aspect of the present invention comprises a component A and a component B; wherein said component A being present in an amount of 40-95% (w/w) of said bloom retarding fat composition, and said component B being present in an amount of 5-60% (w/w) of said bloom retarding fat composition; wherein said component A comprising a fat composition having a content of SatOSat TAGs of 60% (w/w) or higher; and wherein said component B comprising a fat composition having a content of saturated fatty acids of 30% (w/w) or less, and a total content of $Sat_2U$ TAGs of 18% (w/w) or less, and a content $Sat_3$ TAGs of 8% (w/w) or less;

with the proviso that if the content of SatSatU TAGs in component B is 1% (w/w) or more, then the molar ratio of SatSatU:SatUSat TAGs is 1 or higher; and wherein Sat is a C16-20 saturated fatty acid, and wherein O stands for oleic acids; U stands for unsaturated fatty acids, including oleic acid.

Accordingly, the fat composition according to the first aspect of the present invention comprises two components, viz. a component A and a component B in specific amounts.

Component A and component B of the bloom retarding fat composition according to the first aspect of the present invention comprises saturated fatty acids denoted as "Sat". In its general definition, the saturated fatty acids comprised in component A and/or component B of the bloom retarding fat composition according to the first aspect of the present invention may be a C16-C20 fatty acid. However, in one embodiment of the fat according to the first aspect of the present invention the saturated fatty acids comprised in component A and/or component B of the bloom retarding fat composition may be a C16-C18 fatty acid.

Component B of the fat composition according to the first aspect of the present invention may comprise an amount of $Sat_2U$ TAGs. In the present description and in the appended claims, the term "$Sat_2U$ TAG" shall be understood to comprise the symmetric $Sat_2U$ TAGs as well as the asymmetric $Sat_2U$ TAGs. That is, the term "$Sat_2U$ TAG" comprises the TAGs: SatSatU and SatUSat.

In one embodiment of the invention according to the first aspect, the content of SatSatU TAGs in component B is 1% (w/w) or more, and the ratio of SatSatU:SatUSat TAGs in component B is 1 or higher.

It has surprisingly been found that increased bloom retarding can be obtained when the component B of the bloom retarding fat composition according to the first aspect of the present invention comprises a content of SatSatU TAGs of 1% (w/w) or more, and when the ratio of SatSatU:SatUSat TAGs in component B is 1 or higher.

In one embodiment of the invention according to the first aspect, component A of the fat composition having a solid fat content of 50% or higher, such as 55% or higher, such as 60% or higher at a temperature of 25° C. in correspondence with IUPAC 2.150b.

In one embodiment of the invention according to the first aspect, component B of the fat composition having a solid fat content of 25% or less, such as 20% or less, e.g. 15% or less, such as 10% or less, such as 5% or less at a temperature of 25° C. in correspondence with IUPAC 2.150b.

The above stated solid fats contents of component A indicates that in a preferred embodiment, the component A to some extent has a solid fat character. Likewise, the above stated solid fats contents of component B indicates that in a preferred embodiment, the component B to some extent has a liquid fat character. Such solid fat character and liquid fat character of component A and B respectively have proven beneficial for the intended purpose of the fat composition according to a first aspect of the present invention.

The protocol or standard for measuring the solid fats contents of component A and B respectively as defined in respect of these embodiments of the invention follows the standard of IUPAC 2.150b. A person skilled in the art will know the measuring protocol for the determination of the solid fat content in a fat according to standard of IUPAC 2.150b.

In one embodiment of the invention according to the first aspect, the component A of the fat composition is present in an amount of 40-85% (w/w), such as 45-80% (w/w), e.g. 50-75% (w/w), such as 55-70% (w/w), e.g. 60-65% (w/w).

In one embodiment of the invention according to the first aspect, the component B of the fat composition is present in an amount of 10-55 (w/w), such as 15-50% (w/w), such as 20-45% (w/w), e.g. 25-40% (w/w), such as 30-35% (w/w).

Such amounts of component A and B respectively of the bloom retarding fat composition have been found to provide a fine balance of the two components with the view of obtaining a bloom retarding effect.

In one embodiment of the invention according to the first aspect, the sum of the content of component A and B adds up to 100 wt % of the bloom retarding fat composition.

In another embodiment of the invention according to the first aspect, the sum of the content of component A and B adds up 95 wt % or less, such as 90 wt % or less, e.g. 85 wt % or less, such as 80 wt % or less, or 75 wt % or less of the bloom retarding fat composition.

In one embodiment of the invention according to the first aspect, the content of SatOSat TAGs in component A is 65% (w/w) or higher, such as 70% (w/w) or higher, for example 75% (w/w) or higher, such as 80% (w/w) or higher, e.g. 85% (w/w) or higher, such as 90% (w/w) or higher, for example 95% (w/w) or higher.

In one embodiment of the invention according to the first aspect, the content of $Sat_3$ TAGs in component B is 7% (w/w) or less, e.g. 6% (w/w) or less, such as 5% (w/w) or less, for example 4% (w/w) or less, such as 3% (w/w) or less, for example 2% (w/w) or less, or 1% (w/w) or less.

In one embodiment of the invention according to the first aspect, the content of saturated fatty acids in component B is 25% (w/w) or less, such as 24% (w/w) or less, such as 22% (w/w) or less, e.g. 20% (w/w) or less, for example 18% (w/w) or less, such as 16% (w/w) or less, e.g. 14% (w/w) or less, for example 12% (w/w) or less, such as 10% (w/w) or less, for example 8% (w/w) or less, such as 6% (w/w) or less, e.g. 4% (w/w) or less or 2% (w/w) or less.

The above stated contents of SatOSat TAGs in component A and of $Sat_3$ TAGs in component B and of saturated fatty acids in component B all provides appropriate ranges of the respective parameters with the view to obtain a bloom retarding effect of the fat composition according to the first aspect of the present invention.

In one embodiment of the invention according to the first aspect, the total content of SatSatU+SatUSat TAGs in component B is 16% (w/w) or less, e.g. 14% (w/w) or less, for example 12% (w/w) or less, such as 10% (w/w) or less, for example 8% (w/w) or less, such as 6% (w/w) or less, e.g. 4% (w/w) or less or 2% (w/w) or less.

In one embodiment of the invention according to the first aspect, the molar ratio of SatSatU:SatUSat TAGs in component B is 1.2 or higher, such as 1.3 or higher, for example 1.4 or higher, such as 1.5 or higher, for example 1.6 or higher, such as 1.7 or higher or 1.8 or higher.

In some cases the component B may have a relatively high content of saturated fatty acids. In such case it may be preferred that the molar ratio of SatSatU:SatUSat TAGs in component B is higher than 1, as it has been found that in such a situation the bloom retarding effect of the fat composition according to the first aspect of the present invention is improved.

In one embodiment of the invention according to the first aspect, the SatOSat TAG of component A is selected from the group comprising: POP, POSt, StOSt, POA, StOA and AOA; wherein P means palmitic acid, O stands for oleic acid, St means stearic acid, and A stands for arachidic acid.

In one embodiment of the invention according to the first aspect, the $Sat_3$ TAGs of component B is selected from the group comprising: PPP, PPSt, PPA, PStP, PAP, PAA, PStSt, PStA, PASt, APA, StPSt, StPA, StStSt, StStA, StASt, StAA, AStA, AAA; wherein P stands for palmitic acid, St stands for stearic acid and A stands for arachidic acid.

In one embodiment of the invention according to the first aspect, the SatSatU TAGs of component B are selected from the group comprising: PPU, PStU, StPU, StStU, AStU, StAU, AAU, APU, and PAU, wherein P stands for palmitic acid, St stands for stearic acid, and A stands for arachidic acid.

In one embodiment of the invention according to the first aspect, the SatUSat TAGs of component B are selected from the group comprising: PUP, PUSt, StUSt, PUA, StUP, and AUA wherein P stands for palmitic acid, and St stands for stearic acid and A stands for arachidic acid.

In one embodiment of the invention according to the first aspect, the unsaturated fatty acid U in the SatUSat TAGs of component B and/or in the SatSatU TAGs of component B are independently selected from the group comprising: palmitoleic acid (16:1 fatty acid), oleic acid (18:1 fatty acid), linoleic acid (18:2 fatty acid), gamma-linolenic acid (18:3, n-6 fatty acid), linolenic acid (18:3 n-3 fatty acid).

In one embodiment of the first aspect of the present invention the content of UUU TAGs of component B is 5-90 wt %, such as 10-85 wt %, for example 15-80 wt %, such as 20-75 wt %, e.g. 25-70 wt %, such as 30-65 wt %, such as 35-60 wt % or 40-55 wt %, such as 45-50 wt %.

In one embodiment of the first aspect of the present invention the content of SatUU TAGs of component B is independently 5-90 wt %, such as 10-85 wt %, for example 15-80 wt %, such as 20-75 wt %, e.g. 25-70 wt %, such as 30-65 wt %, such as 35-60 wt % or 40-55 wt %, such as 45-50 wt %

The above examples and amounts of the SatOSat TAGs of component A; and the above examples and amounts of the SatSatU TAGs, the SatUSat TAGs and the Sat$_3$ TAGs of component B as well as the above amounts of UUU and SatUU TAGs of component B have all shown to well suited for use of the fat composition according to the first aspect of the present invention in a chocolate composition with the view to retard bloom formation. Furthermore, the preferred vegetable origin of component A and component B will ensure such types of fatty acids.

Accordingly, in one embodiment of the first aspect of the present invention, the TAGs of component A and/or component B are TAGs of vegetable origin.

Such TAGs of vegetable origin may be crude vegetable oils, optionally being subjected to one or more processes selected from the group comprising: filtration, deodorisation, alkaline refining, physical refining, decolourisation, bleaching, fractionation, hardening, interesterification, such as enzymatic and/or chemical interesterification.

Hence, in one embodiment of the first aspect of the present invention, the TAGs of component A and/or component B are edible TAGs.

As the bloom retarding fat composition of the first aspect of the present invention in most situations are intended for use in a chocolate formulation for human consumption, it is preferred that the TAGs making up the bloom retarding fat composition are edible TAGs. However, also other uses may be contemplated with the present invention. Such other non-consumption applications may relate to confectionary for display use, such as for advertising. In such situations, it is not paramount that the final chocolate is edible.

In one embodiment of the first aspect of the present invention, component A comprises one or more TAGs originating from one or more of the following: cocoa butter, illipe oil, mango oil, shea butter/shea butter fractions, sal oil/sal oil fractions, palm fractions or mixtures thereof.

In one embodiment of the first aspect of the present invention, component B comprises one or more TAGs originating from one or more of the following: sunflower oil, such as high oleic sunflower oil, soybean oil, rapeseed oil, maize oil, peanut oil, sesame oil, interesterified shea butter/shea butter fractions, interesterified sal oil/sal oil fractions, interesterified palm olein or mixtures thereof.

In the present description and the appended claims, the term "fraction" shall in this regard be understood to be a product remaining after a physical separation of the constituents of a natural source of a fat. This product may subsequently be subjected to an interesterification. Alternatively, the term "fraction" may also relate to a product obtained after subjecting the constituents of a natural source of a fat to an interesterification and subsequently subjected to a physical separation.

The above origins of the component A and B respectively of the fat composition according to the first aspect of the present invention provides for a fat composition providing a bloom retarding effect on the one hand and providing a satisfactory mouth fell, taste and other sensory parameters, on the other hand, of the final chocolate in which the fat composition is to be included.

In a second aspect, the present invention relates to a method of manufacturing a bloom retarding fat composition according to the first aspect of the present invention. The method comprises the steps:

i) providing a desirable amount of component A;
ii) providing a desirable amount of component B;
iii) optionally providing a desirable amount of other components;
iv) mixing together the components provided in step i), ii) and iii).

Accordingly, the method according to the second aspect of the present invention, simply comprises obtaining the desired components of the fat composition and mixing together the components.

A person skilled in the an will know how to prepare the fat composition according to the first aspect of the present invention from the definition of the composition stated in respect of the first aspect of the present invention.

It is preferred that the components making up the bloom retarding fat composition obtained with the method according to the second aspect of the present invention is mixed thoroughly in order to obtain a homogeneous composition.

A homogeneous composition may conveniently be obtained by heating the component A and the component B prior to mixing to a temperature that ensures that the two components have a liquid nature.

In a third aspect, the present invention relates to the use a fat composition according to the first aspect of the present invention for retarding bloom formation in a chocolate or a chocolate like product.

In the use according to the third aspect of the present invention, the fat composition of the first aspect of the present invention is applied as an ingredient in a chocolate or a chocolate like product.

The purpose of adding the fat composition is to retard bloom formation in the resulting chocolate or a chocolate like product.

In a fourth aspect, the present invention relates to a confectionary fat comprising a bloom retarding fat composition according to the first aspect of the present invention.

Accordingly, the confectionary fat according to the fourth aspect of the present invention comprises a bloom retarding fat composition according to the first aspect of the present invention along with other types of fat.

In one embodiment of the fourth aspect of the present invention, the confectionary fat comprises such a fat composition comprising a TAG mixture of POP, POSt and StOSt TAGs, wherein the content of POP, POSt and StOSt TAGs is 75 wt % or more.

In one embodiment of the fourth aspect of the present invention, the confectionary fat having a content of POP, POSt and StOSt TAGs of 80 wt % or more, such as 85 wt % or more, such as 95 wt % or more.

Preferably the confectionary fat according to the fourth aspect of the present invention is having a taste, a mouth feel and other sensory characteristics resembling those of cocoa butter.

In one embodiment of according to the fourth aspect of the present invention, the confectionary fat is miscible with cocoa butter in all percentages.

In a fifth aspect, the present invention relates to a chocolate or chocolate like product comprising a bloom retarding fat composition according to the first aspect of the present invention; or comprising a confectionary fat according to the fourth aspect of the present invention.

In the present description and in the appended claims of the present application, the term "chocolate" shall be understood to be a product comprising a fat composition, wherein the percentage of cocoa butter is 85 wt % or more of the total amount of fat comprised in said product.

In the present description and in the appended claims of the present application, the term "chocolate like product" shall be understood to be a product comprising a fat composition, wherein the percentage of cocoa butter is less than 85 wt % of the total amount of fat comprised in said product, such as 80 wt % or less, e.g. 75 wt % or less, e.g. 70 wt % or less, such as 65 wt % or less, such as 60 wt % or less, for example 55 wt % or less, such as 50 wt % or less, e.g. 45 wt % or less, such as 40 wt % or less, for example 35 wt % or less, such as 30 wt % or less, e.g. 25 wt % or less, such as 20 wt % or less.

In one embodiment according to the fifth aspect of the present invention, the chocolate or the chocolate like product comprises one or more ingredients selected from the group comprising:
a cocoa butter or a cocoa butter equivalent (CBE); cocoa solids; sugar(s), milk or a milk component, such as milk proteins, milk fat and/or milk carbohydrates; vegetable fat(s); and emulsifier(s).

In one embodiment according to the fifth aspect of the present invention, the chocolate or a chocolate like product is a dark chocolate, a milk chocolate or a white chocolate, or a dark chocolate like product, a milk chocolate like product or a white chocolate like product.

A person skilled in the art will know the additional ingredients and suitable mutual amounts of these ingredients necessary for obtaining such types of chocolate or chocolate-like products.

In one embodiment according to the fifth aspect of the present invention, the chocolate or the chocolate like product comprises water in an amount of 10 wt % or less, such as 8 wt % or less, e.g. 6 wt % or less, such as 4 wt % or less or 2 wt % or less.

Water in the chocolate product or the chocolate like product may adjust hardness, mouth feel and other sensory aspects of the product.

In a sixth aspect, the present invention relates to a filling for a chocolate or a chocolate like product comprising a bloom retarding fat composition according to the first aspect of the present invention; or comprising confectionary fat according to the fourth aspect of the present invention.

It has surprisingly been found that a bloom retarding effect of a chocolate can be obtained by including a bloom retarding fat composition according to the first aspect of the present invention into a filling for such a confectionary. Although the mechanism has not yet been fully elucidated, it is believed that the components responsible for the bloom retarding effect in the bloom retarding fat composition according to the first aspect of the present invention is somehow able to migrate from the filling of a confectionary to the coating of said confectionary, thereby indirectly inducing a bloom retarding effect in a coating of a confectionary.

A person skilled in the art will be able to include a bloom retarding fat composition according to the first aspect of the present invention into a confectionery/bakery filling.

In one embodiment of the filling according to the sixth aspect of the present invention, said filling being a firm filling; an aerated or whipped filling; or a soft filling.

In one embodiment of the filling according to the sixth aspect of the present invention, said filling comprising one or more ingredients selected from the group comprising:
a cocoa butter or a cocoa butter equivalent (CBE); cocoa solids; sugar(s), milk or a milk component, such as milk proteins, milk fat and/or milk carbohydrates; vegetable fat(s); and emulsifier(s), whole nut, ground nut and nut paste.

The above stated ingredients are ingredients which traditionally and conventionally have been used for fillings for a chocolate product or a chocolate-like product, such as a confectionary. These ingredients are also useful when the filling comprises a bloom retarding fat composition according to the first aspect of the present invention.

In a seventh aspect, the present invention relates to a method of manufacturing a chocolate or a chocolate like product according to the fifth aspect of the present invention. This method comprises the steps:
a) mixing a bloom retarding fat composition according to the first aspect of the present invention with other traditionally and/or conventionally chocolate ingredients in order to obtain a chocolate composition, or a chocolate like composition;
b) subjecting the composition obtained in step a) for a thermal tempering process;
c) cooling the composition obtained in step b).

Hence, the method steps of the method according to the seventh aspect of the present invention follows the traditional and conventional way of manufacturing a chocolate or a chocolate like product. This way of manufacturing the chocolate or the chocolate like product according to the seventh aspect of the present invention has proven suitable and efficient.

The invention relates furthermore in an eight aspect to a chocolate confectionary or a chocolate like confectionary comprising a chocolate or chocolate like product according to the fifth aspect of the present invention and/or comprising a filling according to the sixth aspect of the present invention.

In the following sections the present invention will be illustrated with a number of examples showing various embodiments. The examples shall not be construed as limiting the invention as defined in the appended claims in any way.

EXAMPLES

The following examples illustrate the invention according to the present application as well as its advantages.

Example 1 and 2 illustrates two examples wherein a bloom retarding fat composition according to the first aspect of the present invention is added in high amount to a chocolate like coating recipe based on cocoa powder with low fat content.

Example 3 is an example wherein a bloom retarding fat composition according to the first aspect of the present invention is used in a chocolate recipe based on cocoa mass and cocoa butter.

Example 1

Example 1 illustrates the preparation of two bloom retarding fat compositions according to the present invention (Composition I and II) and the preparation of a reference composition which is not according to the present invention (Composition III).

Table 1 below shows selected TAG contents of the three fat samples I, II and III.

Fat sample I consists of 65% (w/w) Shea Stearin IV 33 as the A component and 35% (w/w) High Oleic Sunflower Oil as the B component. The High Oleic Sunflower Oil had a content of UUU of 73 wt % and a content of SatUU of 25 wt %.

Fat sample II consists of 45% (w/w) Shea Stearin IV 33 as the A component and 55% (w/w) of an elain from an interesterified blend based on palm and shea fractions as the B component. The elain had a content of UUU of 22 wt % and a content of SatUU of 68 wt %.

Fat sample III consists of West African cocoa butter.

TABLE 1

| Fat sample | Bloom retarding fat composition according to the invention | | Reference |
|---|---|---|---|
| | I | II | III |
| Fat composition A (% w/w) | 65 | 45 | 100 |
| SatOSat (% w/w) | 72 | 72 | 83 |
| Fat composition B (% w/w) | 35 | 55 | 0 |
| $Sat_2U$ (% w/w) | <1 | 9 | — |
| Ratio SatSatU/SatUSat | — | 2 | — |
| $Sat_3$ (% w/w) | <1 | 1 | — |
| Total percent saturated (SAFA) (% w/w) | 9 | 29 | — |

The three compositions I, II and III set out in table 1 above were then used for preparation of a chocolate or chocolate like coating according to the recipes set out in table 2 below.

TABLE 2

| | Bloom retarding Chocolate/Coating | | Reference |
|---|---|---|---|
| | Chocolate or Chocolate like Coating I | Chocolate or chocolate like Coating II | Chocolate or Chocolate like coating III |
| Fat sample I (% w/w) | 30 | 0 | 0 |
| Fat sample II (% w/w) | 0 | 30 | 0 |
| Fat sample III (% w/w) | 0 | 0 | 30 |
| Cocoa powder (10-12% CB) (% w/w) | 15 | 15 | 15 |
| Sugar (% w/w) | 49 | 49 | 49 |
| Skim milk powder (% w/w) | 6 | 6 | 6 |
| Total fat content (% w/w) | 31.7 | 31.7 | 31.7 |
| Lecithin (% w/w) | 0.4 | 0.4 | 0.4 |

It appears from table 2 that the resulting chocolate/chocolate like composition only differs with respect to the content of the three different fat compositions I, II and III respectively.

The three chocolate/chocolate like coatings in table 2 were tempered in a three zone tempering machine (Aasted AMK 50) in accordance with this machine's tempering program and used for 100 gram chocolate bars and coating of sponge cakes.

Both bars and coated sponge cakes were subsequently cooled in a three zones cooling tunnel for 30 minutes at a temperature of 15° C. followed by a temperature at 12° C. followed by a temperature of 15° C.

After 2 days storage at 20° C. samples were placed in bloom cabinets for bloom tests. The samples were tested under three different conditions.

Condition 1: Isothermal temperature of 20° C.
Condition 2: Isothermal temperature of 25° C.
Condition 3: Cycling temperatures in a cycle of 20° C./25° C./31° C.

Cycling took place between 25° C. and 31° C. with 12 hours time interval with intermittent storage at 20° C. for 6 hours three times a week. Shelf life evaluation was performed after 5 hours at 20° C. The monitoring of appearance of bloom was undertaken for a total of 40 weeks.

Table 3 below illustrates the test result in respect of bloom effect observed for the coatings of table 2.

TABLE 3

| | Bloom retarding Chocolate/Chocolate like Coating according to the invention | | Reference |
|---|---|---|---|
| | Chocolate/Chocolate like coating comprising fat sample I Number of weeks until first appearance of bloom | Chocolate/Chocolate like coating comprising fat sample II Number of weeks until first appearance of bloom | Chocolate/Chocolate like coating comprising fat sample III Number of weeks until first appearance of bloom |
| 100 gram Tablets | | | |
| Condition 1: 20° C. | >40 | >40 | >40 |
| Condition 2: 25° C. | >40 | >40 | 8 |
| Condition 3: 20/25/31° C. | 17 | >40 | 5 |
| Sponge cakes | | | |
| Condition 1: 20° C. | >40 | >40 | >40 |
| Condition 2: 25° C. | >40 | >40 | 6 |
| Condition 3: 20/25/31° C. | 20 | >40 | 5 |

Table 3 shows when bloom arrived first time on the different applications based on the three different fats at the different storage conditions.

It is noted from table 3 that the chocolates comprising fat sample I, II and III within the time span of the experiment (i.e. within 40 weeks) exhibit the same bloom-retarding properties at storage at 20° C. However, at storage at 25° C. isothermal or at 25/31° C. cycle the bloom retarding effect in the chocolates comprising fat sample I and II according to the present invention is highly improved, compared to the reference fat sample of composition III.

Chocolate comprising fat sample II shows absolutely the highest bloom stability at the cycle test conditions.

Example 2

Example 2 illustrates the preparation of two bloom retarding fat compositions according to the present invention (Composition IV and V).

Table 4 below shows selected TAG contents of the two fat samples IV and V.

Fat sample IV consists of 62% (w/w) Shea Stearin IV 33 as the A component and 38% (w/w) of an elain from an interesterified shea fraction as the B component. The elain had a content of UUU of 32 wt % and a content of SatUU of 45 wt %.

Fat sample V consists of 65% (w/w) Shea Stearin IV 33 as the A component and 35% (w/w) High Oleic Sunflower Oil as the B component. The High Oleic Sunflower Oil had a content of UUU of 73 wt % and a content of SatUU of 25 wt %.

TABLE 4

| Fat sample | Bloom retarding fat composition | |
|---|---|---|
| | IV | V |
| Fat composition A (% w/w) | 62 | 65 |
| SatOSat (% w/w) | 72 | 72 |
| Fat composition B (% w/w) | 38 | 35 |
| Sat$_2$U (% w/w) | 15.9 | <1 |
| Ratio SatSatU/SatUSat (% w/w) | 2 | — |
| Sat$_3$ (% w/w) | 1.2 | <1 |
| Total percent saturated (SAFA) (% w/w) | 26.3 | 9 |

The two fat compositions IV and V set out in table 4 above were used for preparation of a chocolate/chocolate like coating based on the recipes set out in following table 5 below.

TABLE 5

| | Bloom retarding Chocolate/Coating | |
|---|---|---|
| | Chocolate/Chocolate like Coating comprising fat sample IV | Chocolate/chocolate like Coating comprising fat sample V |
| Fat sample IV (%w/w) | 30 | 0 |
| Fat sample V (%w/w) | 0 | 30 |
| Cocoa powder (10-12% CB) (% w/w) | 15 | 15 |
| Sugar (% w/w) | 49 | 49 |
| Skim milk powder (% w/w) | 6 | 6 |
| Total fat content (% w/w) | 31.7 | 31.7 |
| Lecithin (% w/w) | 0.4 | 0.4 |

It appears from table 5 that the resulting chocolate composition only differs with respect to the content of the three different fat compositions IV and V respectively.

The two chocolate/chocolate like coatings in table 5 were tempered in a three zone tempering machine (Aasted AMK 50) in accordance with this machine's tempering program and used for 100 gram chocolate bars.

The bars were subsequently cooled in a three zones cooling tunnel for 30 minutes at a temperature of 15° C. followed by a temperature at 12° C. followed by a temperature of 15° C.

After 2 days storage at 20° C. samples were placed in bloom cabinets for bloom tests. The samples were tested under three different conditions.

Condition 1: Isothermal temperature of 20° C.
Condition 2: Isothermal temperature of 25° C.
Condition 3: Cycling temperatures in a cycle of 20° C./25° C./31° C.

Cycling took place between 25° C. and 31° C. with 12 hours time interval with intermittent storage at 20° C. for 6 hours three times a week. Shelf life evaluation was performed 5 after hours at 20° C. The monitoring of appearance of bloom was undertaken for a total of 36 weeks.

Table 6 below illustrates the test result in respect of bloom effect observed for the coatings of table 5.

TABLE 6

| | Bloom retarding Chocolate/Chocolate like Coating | |
|---|---|---|
| 100 gram Tablets | Chocolate/Chocolate like coating comprising fat sample IV Number of weeks until first appearance of bloom | Chocolate/Chocolate like coating comprising fat sample V Number of weeks until first appearance of bloom |
| Condition 1: 20° C. | >36 | >36 |
| Condition 2: 25° C. | >36 | >36 |
| Condition 3: 20/25/31° C. | >36 | 11 |

Table 6 shows that the chocolates comprising fat sample IV and V within the first 36 weeks of storage at 20° C. and at 25° C. exhibited the same bloom-retarding properties.

However, at storage at temperature cycling conditions, the bloom retarding effect in the chocolates comprising fat sample IV was superior to that of chocolates comprising fat sample V.

Example 3

Example 3 is a comparative example illustrating the use of a fat composition comprising one or two of the components A or B.

Table 7 below shows selected TAG contents of the four fat samples VI, VII, VIII and IX.

Fat sample VI and VII consist of cocoa butter and cocoa butter in cocoa mass from the recipe (Table 8) as the A component and High Oleic Sunflower Oil as the B component. The High Oleic Sunflower Oil had a content of UUU of 73 wt % and a content of SatUU of 25 wt %.

Fat sample VIII consists of cocoa butter and cocoa butter in cocoa mass from the recipe (Table 8) as the A component and an olein from an interesterified shea fraction as the B component. The elain had a content of UUU of 32 wt % and a content of SatUU of 45 wt %.

Fat sample IX consists West African cocoa butter as the A component.

TABLE 7

| | Bloom retarding fat composition | | | Reference |
|---|---|---|---|---|
| Fat sample | VI | VII | VIII | IX |
| Fat composition A (% w/w) | 90 | 80 | 80 | 100 |
| SatOSat (% w/w) | 83 | 83 | 83 | 83 |
| Fat composition B (% w/w) | 10 | 20 | 20 | 0 |
| Sat$_2$U (% w/w) | <1 | <1 | 15.9 | — |
| Ratio SatSatU/SatUSat | — | — | 2 | — |
| Sat$_3$ (% w/w) | <1 | <1 | 1.2 | — |
| Total percent saturated (SAFA) (% w/w) | 9 | 9 | 26.3 | — |

The four fat compositions VI, VII, VIII and IX set out in table 7 above were used for preparation of a chocolate/chocolate like coating based on the recipes set out in following table 8 below:

TABLE 8

|  | Bloom retarding Chocolate/Coating | | | Reference |
|---|---|---|---|---|
|  | Chocolate/ Chocolate like coating comprising fat sample VI | Chocolate/ chocolate like coating comprising fat sample VII | Chocolate/ chocolate like coating comprising fat sample VIII | Chocolate/ chocolate like coating comprising fat sample IX |
| Fat sample VI (B component) (% w/w) | 3.6 | 0 | 0 | 0 |
| Fat sample VII (B component) (%w/w) | 0 | 7.3 | 0 | 0 |
| Fat sample VIII (B component) (% w/w) | 0 | 0 | 7.3 | 0 |
| Cocoa butter (% w/w) | 10.4 | 6.7 | 6.7 | 14.0 |
| Cocoa Mass (56% cocoa butter) (% w/w) | 40.0 | 40.0 | 40.0 | 40.0 |
| Sugar (% w/w) | 46.0 | 46.0 | 46.0 | 46.0 |
| Total fat content (% w/w) | 36.4 | 36.4 | 36.4 | 36.4 |
| Lecithin (% w/w) | 0.4 | 0.4 | 0.4 | 0.4 |

The four chocolate/chocolate like coatings in table 8 were tempered in a three zone tempering machine (Aasted AMK 50) in accordance with this machine's tempering program and used for as a chocolate coating for an extruded hazel nut center.

The coated hazel nut centers were subsequently cooled in a three zones cooling tunnel for 30 minutes at a temperature of 15° C. followed by a temperature at 12° C. followed by a temperature of 15° C.

After 2 days storage at 20° C. samples were placed in bloom cabinets for bloom tests. The samples were tested under two different conditions.

Condition 1: Isothermal temperature of 20° C.
Condition 4: Isothermal temperature of 23° C.

The monitoring of appearance of bloom was undertaken for a total of 30 weeks.

Table 9 below illustrates the test results in respect to bloom effect observed for the four chocolate/chocolate like coated hazel nut center applications.

TABLE 9

|  | Bloom retarding Chocolate/Chocolate like Coating | | | Reference |
|---|---|---|---|---|
| Coated hazel nut center | Chocolate/Chocolate like Coating VI Number of weeks until first appearance of bloom | Chocolate/Chocolate like Coating VII Number of weeks until first appearance of bloom | Chocolate/Chocolate like Coating VIII Number of weeks until first appearance of bloom | Chocolate/Chocolate like coating IX Number of weeks until first appearance of bloom |
| Condition 1: 20° C. | >30 | >30 | >30 | 7 |
| Condition 4: 23° C. | >30 | >30 | >30 | 7 |

Table 9 shows when bloom arrived first time on the two different applications based on the four different fats at the different storage conditions.

No bloom was observed for coating VI, VII and VIII within the time of monitoring appearance of bloom (30 weeks), whereas bloom was observed for the reference coating IX after 7 weeks at either storage condition. Accordingly, it is evident from this experiment that a bloom retarding fat composition according to the first aspect of the present invention and exemplified by the compositions VI, VII and VIII will suppress bloom formation occasioned by migration of fats from a center of the confectionary, compared with a reference coating not comprising such a bloom retarding fat composition.

The invention claimed is:

1. A bloom retarding fat composition comprising:
   (i) a component A comprising a fat composition comprising a content of SatOSat TAGs of 60% (w/w) or higher; and
   (ii) a component B comprising:
      (a) a fat composition comprising a content of saturated fatty acids of 30% (w/w) or less,
      (b) a content of $Sat_3$ TAGs of 8% (w/w) or less, and
      (c) a content of $Sat_2U$ TAGs of 18% (w/w) or less, wherein
      the ratio of SatSatU:SatUSat TAGs of the content of $Sat_2U$ TAGs is 1 or higher,
      the content of SatSatU TAGs of the content of $Sat_2U$ TAGs is 1% (w/w) or more, and
      the SatSatU TAGs of the content of $Sat_2U$ TAGs is chosen from a group consisting of PPU, PStU, StPU, StStU, ASCU, StAU, AAU, APU, PAU, or a mixture thereof;
wherein Sat is a C16-20 saturated fatty acid, O stands for oleic acids, U stands for unsaturated fatty acids, P stands for palmitic acid, St stands for stearic acid and A stands for arachidic acid, and
wherein the sum of the component A and the component B is 100% of the bloom retarding fat composition,
   component A is present in an amount of about 40-95 (w/w) of the bloom retarding fat composition, and
   component B is present in an amount of 5-60% (w/w) of the fat bloom retarding fat composition.

2. A bloom retarding fat composition according to claim 1, wherein component A comprises a solid fat content of 50% or higher at a temperature of 25° C. in correspondence with IUPAC 2.150b.

3. A bloom retarding fat composition according to claim 1, wherein component B comprises a solid fat content of 25% or less at a temperature of 25° C. in correspondence with IUPAC 2.150b.

4. A bloom retarding fat composition according to claim 1, wherein component A is present in an amount of 40-85% (w/w).

5. A bloom retarding fat composition according to claim 1, wherein component B is present in an amount of 10-55 (w/w).

6. A bloom retarding fat composition according to claim 1, wherein component A comprises a fat composition comprising a content of SatOSat TAGs.

7. A bloom retarding fat composition according to claim 1, wherein component B comprises a content of $Sat_3$ TAGs of 7% (w/w) or less.

8. A bloom retarding fat composition according to claim 1, wherein the content of saturated fatty acids in component B is 25% (w/w) or less.

9. A bloom retarding fat composition according to claim 1, wherein the content of $Sat_2U$ TAGs in component B comprises a content of SatSatU TAGs and SatUSat TAGs of 16% (w/w) or less.

10. A bloom retarding fat composition according to claim 1, wherein the content of $Sat_2U$ TAGs of component B comprises a ratio of SatSatU:SatUSat TAGs of 12 or higher.

11. A bloom retarding fat composition according to claim 1, wherein the SatOSat TAG of component A is chosen from the group consisting of POP, POSt, StOSt, POA, StOA, AOA, or a mixture thereof.

12. A bloom retarding fat composition according to claim 1, wherein the $Sat_3$ TAGs of component B is chosen from the group consisting of PPP, PPSt, PPA, PStP, PAP, PAA, PStSt, PStA, PASt, APA, StPSt, StPA, StStSt, StStA, StASt, StAA, AStA, AAA, or a mixture thereof.

13. A bloom retarding fat composition according to claim 1, wherein the SatUSat TAGs of the content of $Sat_2U$ TAGs of component B are chosen from the group consisting of PUP, PUSt, StUSt, PUA, StUA, AUA, or a mixture thereof.

14. A bloom retarding fat composition according to claim 1, wherein the unsaturated fatty acid U in the SatUSat TAGs and SatSatU TAGs of the content of $Sat_2U$ TAGs of component B is independently chosen from the group consisting of palmitoleic acid, oleic acid, linoleic acid, gamma-linolenic acid, linolenic acid, or a mixture thereof.

15. A method of manufacturing a bloom retarding fat composition according to claim 1, comprising the steps;
  i) providing a desirable amount of component A;
  ii) providing a desirable amount of component B;
  iii) mixing together the components provided in step i) and ii).

16. A confectionary fat comprising a bloom retarding fat composition according to claim 1.

17. A chocolate or chocolate like product comprising a confectionary fat according to claim 16.

18. A filling for a chocolate or a chocolate like product comprising a confectionary fat according to claim 16.

19. A chocolate confectionary or a chocolate like confectionary comprising a filling according to claim 18.

20. A chocolate or chocolate like product comprising a bloom retarding fat composition according to claim 1.

21. A chocolate confectionary or a chocolate like confectionary comprising a chocolate or chocolate like product according to claim 20.

22. A chocolate confectionary or a chocolate like confectionary comprising a chocolate or chocolate like product according to claim 20.

23. A filling for a chocolate or a chocolate like product comprising a bloom retarding fat composition according to claim 1.

24. A chocolate confectionary or a chocolate like confectionary comprising a filling according to claim 23.

25. A method of manufacturing a chocolate or a chocolate like product comprising the steps:
  a) mixing the bloom retarding fat composition according to claim 1 with at least one other chocolate ingredient;
  b) subjecting the composition obtained in step a) to a thermal tempering process;
  c) cooling the composition obtained in step b).

26. A method of manufacturing a chocolate or a chocolate like product comprising a confectionary fat, comprising the steps:
  (a) mixing a bloom retarding fat composition according to claim 1 with at least one other chocolate ingredient;
  (b) subjecting the composition obtained in step (a) to a thermal tempering process;
  (c) cooling the composition obtained in step (b).

27. A bloom retarding fat composition of claim 1 wherein the unsaturated fatty acid is an oleic acid.

* * * * *